United States Patent
Ootomo et al.

(10) Patent No.: US 9,378,862 B2
(45) Date of Patent: Jun. 28, 2016

(54) DIELECTRIC MATERIAL

(71) Applicant: Sumitomo Osaka Cement Co., Ltd., Tokyo (JP)

(72) Inventors: Megumi Ootomo, Tokyo (JP); Yoshiki Yoshioka, Tokyo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 0 days.

(21) Appl. No.: 14/760,160

(22) PCT Filed: Jan. 14, 2014

(86) PCT No.: PCT/JP2014/050471
§ 371 (c)(1),
(2) Date: Jul. 9, 2015

(87) PCT Pub. No.: WO2014/112486
PCT Pub. Date: Jul. 24, 2014

(65) Prior Publication Data
US 2015/0340121 A1 Nov. 26, 2015

(30) Foreign Application Priority Data

Jan. 16, 2013 (JP) ................... 2013-005473

(51) Int. Cl.
*C04B 35/00* (2006.01)
*H01B 3/12* (2006.01)
*C04B 35/10* (2006.01)
*C04B 35/505* (2006.01)
*C04B 35/584* (2006.01)
*H01B 3/00* (2006.01)

(52) U.S. Cl.
CPC *H01B 3/12* (2013.01); *C04B 35/10* (2013.01); *C04B 35/505* (2013.01); *C04B 35/584* (2013.01); *H01B 3/004* (2013.01)

(58) Field of Classification Search
CPC ..... H01G 4/12; H01G 4/1209; H01G 4/1227; C04B 35/468; C04B 35/4682
USPC .................... 501/137, 138, 139, 99, 100, 101
See application file for complete search history.

(56) References Cited

U.S. PATENT DOCUMENTS

| | | | | | |
|---|---|---|---|---|---|
| 3,923,697 A | * | 12/1975 | Ellis | ........................ | H05B 3/145 106/241 |
| 4,147,911 A | * | 4/1979 | Nishitani | ................ | C04B 35/64 219/678 |
| 5,099,388 A | * | 3/1992 | Ogawa | ..................... | H01G 4/12 361/306.1 |
| 5,863,468 A | * | 1/1999 | Czubarow | ............ | H01C 17/065 252/518.1 |
| 5,868,884 A | * | 2/1999 | Oiwa | .................... | C04B 35/111 156/264 |
| 6,627,169 B1 | * | 9/2003 | Itoh | ........................ | C01B 31/36 423/345 |

FOREIGN PATENT DOCUMENTS

| | | |
|---|---|---|
| JP | 06267905 A | 9/1994 |
| JP | 07267722 A | 10/1995 |
| JP | 10326824 | 12/1998 |
| JP | 10335438 A | 12/1998 |
| JP | 2000332090 A | 11/2000 |
| JP | 2002305237 A | 10/2002 |
| JP | 2005175122 A | 6/2005 |
| JP | 2006351390 A | 12/2006 |
| JP | 2008047564 A | 2/2008 |

OTHER PUBLICATIONS

International Search Report issued in International Patent Application No. PCT/JP2014/050471, mailed Mar. 4, 2014, 4 pages.

* cited by examiner

*Primary Examiner* — Noah Wiese
(74) *Attorney, Agent, or Firm* — Wood, Herron & Evans, LLP

(57) ABSTRACT

A dielectric material which is able to detect a sign of insulation breakdown before use or while in use, and thus is able to predict the insulation breakdown in advance is provided. Such a dielectric material is made of a composite sintered compact in which conductive particles are dispersed in an insulating material, in which in the conductive particles, a particle diameter D10 having a cumulative volume percentage of 10% by volume in a volume particle size distribution is 0.2 μm or less, a particle diameter D90 having a cumulative volume percentage of 90% by volume is 2 μm or less, a ratio (D90/D10) of the particle diameter D90 having a cumulative volume percentage of 90% by volume to the particle diameter D10 having a cumulative volume percentage of 10% by volume is 3.0 or more, and a ratio (D90/D50) of the particle diameter D90 having a cumulative volume percentage of 90% by volume to the particle diameter D50 having a cumulative volume percentage of 50% by volume is 1.4 or more.

15 Claims, No Drawings

DIELECTRIC MATERIAL

TECHNICAL FIELD

The present invention relates to a dielectric material, and more specifically, relates to a dielectric material which is suitable for being used as a material of a configuration member of a vacuum processing device such as an etching device, a sputtering device, and a CVD device which are applied to a manufacturing process of a semiconductor, a liquid crystal display, or the like.

This application claims priority on the basis of Japanese Patent Application No. 2013-005473, filed on Jan. 16, 2013, and the content thereof is incorporated herein.

BACKGROUND ART

In the related art, in various treatments such as etching or sputtering of a manufacturing line of a semiconductor device such as IC, LSI, and VLSI, components configured of ceramics such as alumina have been widely used. For example, as a ceramic part in the semiconductor manufacturing device, an electrostatic chuck is included.

The electrostatic chuck is required to have high adhesiveness, excellent thermal conductivity, and durability as a support mechanism of a semiconductor substrate such as a silicon wafer. The electrostatic chuck includes an approximately disk-like insulating body on which the semiconductor substrate is mounted, and an electrostatic attracting internal electrode which is embedded in the insulating body, and a direct-current voltage is applied between the insulating body and the semiconductor substrate mounted on the insulating body, and thus a Coulomb force or an electrostatic attracting force due to a minor leaked current is generated, and the semiconductor substrate is fixed to the insulating body by the electrostatic attracting force.

As the insulating body used in the electrostatic chuck, ceramics such as aluminum oxide and aluminum nitride have been generally used.

In particular, the ceramics are excellent for thermal conductivity and plasma resistance, but are rarely mixed with the substrate due to hardness thereof, and thus when the semiconductor substrate is transported, a flaw, a crack, or the like may occur, or degradation of insulation properties which is caused by using the semiconductor substrate over a long period of time and insulation breakdown caused by damage due to plasma or corrosive gas may occur, and an element on the semiconductor substrate may be broken during the various treatment such as etching or sputtering.

Therefore, as a technology of detecting the insulation breakdown of the insulating body of the electrostatic chuck, a technology is proposed in which a current detector is disposed in a circuit of an electric source connected to the electrostatic chuck, the insulation breakdown of the insulating body is detected, and continuous use of the electrostatic chuck in which the insulation breakdown occurs is prevented (refer to Patent Literature Nos. 1, 2, and the like).

In addition, a technology is proposed in which a potential difference between the electrostatic attracting internal electrode of the electrostatic chuck and a ground electrode is measured, and thus the insulation breakdown of the insulating body is detected (refer to Patent Literature No. 3 and the like).

In addition, an electrostatic chuck using a porous dielectric instead of the insulating body is proposed (refer to Patent Literature No. 4 and the like). In the electrostatic chuck, a diagnostic method for preventing insulation breakdown due to adsorption of moisture is adopted.

CITATION LIST

Patent Literature

[Patent Literature No. 1] Japanese Laid-open Patent Publication No. 2005-175122
[Patent Literature No. 2] Japanese Laid-open Patent Publication No. 2002-305237 [Patent Literature No. 3] Japanese Laid-open Patent Publication No. 06-267905
[Patent Literature No. 4] Japanese Laid-open Patent Publication No. 2008-47564

SUMMARY OF INVENTION

However, the Coulomb force type electrostatic chuck of the related art is used by applying a high voltage of 1000 V or more to the insulating body, and thus when the insulation breakdown occurs in the insulating body while applying a high voltage to the insulating body, the insulation breakdown instantaneously occurs and a high current flows, and thus the electrostatic chuck is in a unusable state at the time of detecting the insulation breakdown. Therefore, in the method disclosed in Patent Literature Nos. 1 to 3, it is not possible to predict in advance that the electrostatic chuck is not able to be used due to the insulation breakdown.

In addition, when the insulation breakdown occurs in the electrostatic chuck, the high current flows intensively through one point where the insulation breakdown occurs in a step where the high current which is generated by the insulation breakdown is detected, and thus a device on the semiconductor substrate is damaged due to the high current. Therefore, it is not possible to prevent the insulation breakdown from occurring in the electrostatic chuck while in use, and it is difficult to prevent the device from being damaged due to the insulation breakdown.

On the other hand, the electrostatic chuck using the porous dielectric instead of the insulating body which is disclosed in Patent Literature No. 4 is just able to detect degradation of insulation properties which is caused by adsorbing moisture of the porous dielectric, and thus it is not possible to detect essential degradation of insulation properties of the dielectric itself. Therefore, it is not possible to predict in advance that the electrostatic chuck is not able to be used due to the insulation breakdown, and it is not possible to prevent the insulation breakdown from occurring in the electrostatic chuck while in use, and thus it is difficult to prevent the device from being damaged due to the insulation breakdown.

The present invention has been made in consideration of the above-described circumstances and an object of the present invention is to provide a dielectric material which is able to detect a sign of insulation breakdown before use or while in use, and thus is able to predict the insulation breakdown in advance.

As a result of intensive studies for solving the problems described above, the present inventors have found that a dielectric material made of a composite sintered compact in which conductive particles are dispersed in an insulating material, in which when in the conductive particles, a particle diameter D10 having a cumulative volume percentage of 10% by volume in a volume particle size distribution is 0.2 μm or less, a particle diameter D90 having a cumulative volume percentage of 90% by volume is 2 μm or less, a ratio (D90/D10) of the particle diameter D90 having a cumulative volume percentage of 90% by volume to the particle diameter D10 having a cumulative volume percentage of 10% by volume is 3.0 or more, and a ratio (D90/D50) of the particle diameter D90 having a cumulative volume percentage of 90% by volume to a particle diameter D50 having a cumulative volume percentage of 50% by volume is 1.4 or more, insulation breakdown in the dielectric material is able to slowly progress, and thus the insulation breakdown is able to be predicted in advance by measuring electric resistance of the dielectric material before use or while in use, and thus the present inventors have accomplished the present invention.

That is, according to an aspect of the invention, there is provided a dielectric material made of a composite sintered compact in which conductive particles are dispersed in an insulating material. In the conductive particles, a particle diameter D10 having a cumulative volume percentage of 10% by volume in a volume particle size distribution is 0.2 μm or less, a particle diameter D90 having a cumulative volume percentage of 90% by volume is 2 μm or less, a ratio (D90/D10) of the particle diameter D90 having a cumulative volume percentage of 90% by volume to the particle diameter D10 having a cumulative volume percentage of 10% by volume is 3.0 or more, and a ratio (D90/D50) of the particle diameter D90 having a cumulative volume percentage of 90% by volume to a particle diameter D50 having a cumulative volume percentage of 50% by volume is 1.4 or more.

It is preferable that a content rate of the conductive particles is 4% by mass or more and 20% by mass or less.

It is preferable that the conductive particles are one or two or more selected from a group consisting of conductive silicon carbide particles, molybdenum particles, tungsten particles, tantalum particles, and carbon particles.

It is preferable that the insulating material is one or two or more selected from a group consisting of aluminum oxide, yttrium oxide, silicon oxide, zirconium oxide, aluminum nitride, silicon nitride, and mullite.

It is preferable that the relative permittivity be 11 or more.

It is preferable that the withstand voltage be 5 kV/mm or more.

According to the dielectric material of the present invention, in the conductive particles, the particle diameter D10 having a cumulative volume percentage of 10% by volume in the volume particle size distribution is 0.2 μm or less, the particle diameter D90 having a cumulative volume percentage of 90% by volume is 2 μm or less, the ratio (D90/D10) of the particle diameter D90 having a cumulative volume percentage of 90% by volume to the particle diameter D10 having a cumulative volume percentage of 10% by volume is 3.0 or more, and the ratio (D90/D50) of the particle diameter D90 having a cumulative volume percentage of 90% by volume to a particle diameter D50 having a cumulative volume percentage of 50% by volume is 1.4 or more, and thus the insulation breakdown of the dielectric material made of the composite sintered compact is able to slowly progress. Therefore, it is possible to recognize a sign of the insulation breakdown from an electric resistance value by measuring the electric resistance of the dielectric material made of the composite sintered compact before use or while in use. As a result thereof, it is possible to predict the insulation breakdown of the dielectric material made of the composite sintered compact in advance.

DESCRIPTION OF EMBODIMENTS

An embodiment of a dielectric material of the present invention will be described.

Furthermore, the following embodiment will be described in detail in order to more easily understand the gist of the present invention, and the present invention is not limited to the embodiment unless specified otherwise.

[Dielectric Material]

A dielectric material of this embodiment is a dielectric material made of a composite sintered compact in which conductive particles are dispersed in an insulating material, and is a dielectric material in which a particle diameter D10 having a cumulative volume percentage of 10% by volume in a volume particle size distribution is 0.2 μm or less, a particle diameter D90 having a cumulative volume percentage of 90% by volume is 2 μm or less, a ratio (D90/D10) of the particle diameter D90 having a cumulative volume percentage of 90% by volume to the particle diameter D10 having a cumulative volume percentage of 10% by volume is 3.0 or more, and a ratio (D90/D50) of the particle diameter D90 having a cumulative volume percentage of 90% by volume to a particle diameter D50 having a cumulative volume percentage of 50% by volume is 1.4 or more in the conductive particles.

Here, the reason for finding the dielectric material of this embodiment will be described.

The formation of a conductive path of the dielectric material made of the composite sintered compact in which the conductive particles are dispersed in the insulating material is able to be described by using a percolation theory.

In this percolation theory, it is known that when the ratio of the conductive particles dispersed in the insulating material exceeds a constant threshold value, electric conductivity rapidly increases (a resistance value decreases), and the association of the conductive particles in the vicinity of the threshold value is in a fractal shape.

Therefore, the present inventors have considered that it is necessary to slow down the insulation breakdown in the dielectric material made of the composite sintered compact, that is, to make branches of the conductive path at the time of occurring the insulation breakdown large in order to improve insulation breakdown properties of the dielectric material, that is, to increase a fractal dimension of the conductive path.

On the basis of this consideration, the dielectric material which slows down the insulation breakdown is prepared by dispersing a constant amount of the conductive particles satisfying conditions in which a particle size distribution is constant in the insulating material, and it has been found that when the fractal dimension of the conductive path of the dielectric material increases, the insulation breakdown occurs with a wide distribution not in a pinhole-like shape, and thus properties of slowing down the insulation breakdown are able to be obtained.

In addition, it has been found that when the conductive particles having a threshold value or more are included by widening the particle size distribution of the conductive particles in the insulating material, the fractal dimension of the association of the conductive particles increases, and in contrast, when the conductive particles having a threshold value or less are included, the fractal dimension of the conductive path due to the insulation breakdown increases.

In addition, it has been found that when the particle size distribution of the conductive particles in the insulating material is widened, it is possible to increase the content rate of the conductive particles, and the threshold value at which the conductive path is formed increases, and thus it is possible to increase the content rate of the conductive particles while maintaining insulation properties, and the dielectric material having high permittivity is able to be obtained.

As described above, it is found that when a base material of a Coulomb force type electrostatic chuck is prepared by using the dielectric material having high permittivity, it is possible to predict insulation breakdown in an electrostatic chuck by measuring electric resistance or a current value, and thus the present invention has been accomplished.

Next, the dielectric material of this embodiment will be described in detail.

In the insulating material used in the dielectric material, various organic resins such as a polyimide resin or a silicon resin and insulating ceramics are able to be suitably selected, but degradation of insulation properties due to heat generation easily occurs in the organic resin, and properties of slowing down the insulation breakdown are rarely obtained, and thus it is preferable to use the insulating ceramics.

As the insulating material, that is, the insulating ceramics, oxide made of only one selected from a group consisting of aluminum oxide ($Al_2O_3$), yttrium oxide ($Y_2O_3$), silicon oxide ($SiO_2$), zirconium oxide ($ZrO_2$), aluminum nitride (AlN), silicon nitride ($Si_3N_4$), mullite ($3Al_2O_3.2SiO_2$), hafnium oxide ($HfO_2$), scandium oxide ($Sc_2O_3$), neodymium oxide ($Nd_2O_3$), niobium oxide ($Nb_2O_5$), samarium oxide ($Sm_2O_3$), ytterbium oxide ($Yb_2O_3$), erbium oxide ($Er_2O_3$), and cerium oxide ($CeO_2$), or composite oxide in which two or more thereof are mixed is preferable.

Among them, in particular, aluminum oxide ($Al_2O_3$) is inexpensive and is excellent for heat resistance, and mechanical properties of the composite sintered compact are also excellent, and thus aluminum oxide is preferably used in the dielectric material of this embodiment.

In addition, when using the insulating ceramics in which the content of aluminum (Al) is small or further increasing corrosion resistance, yttrium oxide ($Y_2O_3$), yttrium.aluminum.garnet (YAG: $3Y_2O_3.5Al_2O_3$), and the like are able to be used.

As a raw material powder of aluminum oxide ($Al_2O_3$), an aluminum oxide powder having an average particle diameter of 1 µm or less is preferably used.

The reason is that in a silicon carbide-aluminum oxide composite sintered compact obtained by using the aluminum oxide powder of which the average particle diameter exceeds 1 µm, the average particle diameter of the aluminum oxide particles in the composite sintered compact exceeds 2 µm, and when a base material of an electrostatic chuck device is prepared by using the silicon carbide-aluminum oxide composite sintered compact, an upper surface of the base material on which a plate-like specimen is mounted is easily etched by plasma, and thus a sputtering mark is formed on the upper surface of the base material, and an object to be adsorbed such as a silicon wafer may be contaminated.

The raw material powder of aluminum oxide ($Al_2O_3$) having an average particle diameter of 1 µm or less may have high purity, but is not particularly limited.

As the conductive particles, one or two or more selected from a group consisting of conductive ceramics particles such as conductive silicon carbide (SiC) particles, high melting point metal particles such as molybdenum (Mo) particles, tungsten (W) particles, and tantalum (Ta) particles, and carbon (C) particles are preferable.

Among them, when the conductive silicon carbide (SiC) particles are composited with the aluminum oxide ($Al_2O_3$) particles, in the obtained composite sintered compact, temperature dependency of the electrical properties decreases, corrosion resistance with respect to halogen gas is excellent, heat resistance and thermal shock resistance are excellent, and a risk of damage due to a thermal stress decreases even at the time of being used at a high temperature, and thus it is preferable.

As the conductive silicon carbide (SiC) particles, a silicon carbide powder having a β-type crystal structure is preferably used since the silicon carbide powder having excellent conductivity. Furthermore, in order to control the conductivity of the silicon carbide powder, a silicon carbide powder may be used in which the content rate of nitrogen in silicon carbide is suitably controlled.

As the conductive silicon carbide (SiC) particles, a silicon carbide powder obtained by using various methods such as a plasma CVD method, a precursor method, a thermal carbon reductive method, and a laser thermal decomposition method is able to be used. In particular, when the dielectric material of this embodiment is used in a semiconductor process, a dielectric material having high purity is preferably used in order to prevent a harmful influence on the semiconductor process.

In the conductive particles of the dielectric material, it is preferable that the particle diameter D10 having a cumulative volume percentage of 10% by volume in the volume particle size distribution is 0.2 µm or less, the particle diameter D90 having a cumulative volume percentage of 90% by volume is 2 µm or less, and the ratio (D90/D10) of the particle diameter D90 having a cumulative volume percentage of 90% by volume to the particle diameter D10 having a cumulative volume percentage of 10% by volume is 3.0 or more.

In addition, the ratio (D90/D50) of the particle diameter D90 having a cumulative volume percentage of 90% by volume to the particle diameter D50 having a cumulative volume percentage of 50% by volume is preferably 1.4 or more, and is more preferably 1.5 or more.

Here, the reason that various numerical values in the volume particle size distribution of the conductive particles are defined as that described above will be described.

In the size of the conductive particles in the dielectric material, when large conductive particles excessively increase, degradation of plasma resistance or increase of particles may occur at the time of being used as the base material of the electrostatic chuck. Accordingly, it is preferable that the particle diameter D90 having a cumulative volume percentage of 90% by volume is 2 µm or less (the conductive particles of 2 µm or more are 10% or less), and it is more preferable that the particle diameter D90 having a cumulative volume percentage of 90% by volume is 1 µm or less (the conductive particles of 1 µm or more are 10% or less).

In addition, when the conductive particles having a fine particle diameter excessively increase and a blended amount of the conductive particles increases, since the number of conductive particles excessively increases, the conductive particles existing in a particle boundary of insulating particles are easily associated. As a result, it is not possible to increase the blended amount of the conductive particles by increasing withstand voltage, that is, it is not possible to increase permittivity. Therefore, it is preferable that the particle diameter D90 having a cumulative volume percentage of 90% by volume is 0.5 µm or more. In addition, from the same reason, it is preferable that the particle diameter D50 having a cumulative volume percentage of 50% by volume is 0.3 µm or more.

On the other hand, the thickness of the finest conductive path formed due to insulation breakdown depends on the size or the ratio of the conductive particles dispersed in the dielectric material. Therefore, in order to easily obtain properties of slowing down insulation breakdown, it is necessary to decrease the thickness of the finest conductive path, and thus it is preferable that the particle diameter D10 having a cumulative volume percentage of 10% by volume in the volume particle size distribution of the conductive particles is 0.2 µm or less.

Further, in order to increase the branches of the conductive path by making the branches of the insulation breakdown fine, the particles of 0.04 μm or less are preferably included at 0.001% or more, and more preferably included at 1% or more and 10% or less.

In addition, in order to slow down the insulation breakdown, the ratio (D90/D10) of the particle diameter D90 having a cumulative volume percentage of 90% by volume to the particle diameter D10 having a cumulative volume percentage of 10% by volume is 3.0 or more, and the ratio (D90/D50) of the particle diameter D90 having a cumulative volume percentage of 90% by volume to the particle diameter D50 having a cumulative volume percentage of 50% by volume is preferably 1.4 or more, and is more preferably 1.5 or more, in addition to the condition where the particle diameter D10 having a cumulative volume percentage of 10% by volume is 0.2 μm or less.

In addition, in order to obtain an effect of efficiently widening the particle size distribution, it is preferable that the particle size distribution has a smooth curve at the time of making the particle size distribution into a graph.

Furthermore, a particle diameter of the conductive particles in the raw material powder and a particle diameter of the conductive particles in the dielectric material are changed according to pulverization in a manufacturing procedure or sintering, and thus are not the same particle diameter. Therefore, it is necessary that the particle diameter of the conductive particles in the raw material powder is determined in order to set the particle diameter of the conductive particles in the dielectric material to be in the range described above.

However, it is difficult to obtain the particles of 0.04 μm or less by the pulverization in the manufacturing procedure, and thus it is preferable that the conductive particles are used in which the particles having a particle diameter of 0.04 μm or less are included at 1% or more (a particle diameter D1 having a cumulative volume percentage of 1% by volume is 0.04 μm or less) in order to include the particles of 0.04 μm or less in the conductive particles of the dielectric material by 0.001% or more.

Further, in order to set the amount of the particles of 2 μm or more included in the conductive particles of the composite sintered compact to be 10% or less (the particle diameter D90 is 2 μm or less), it is preferable that the particles having a particle diameter of 1 μm or more in the raw material of the conductive particles is 1% or less (the particle diameter D99 is 1 μm or less).

In addition, when various conductive particles are used by being mixed, it is preferable that the total of each type of conductive particles satisfies the conditions described above.

The content rate of the conductive particles in the dielectric material is preferably 4% by mass or more and 20% by mass or less, is more preferably 5% by mass or more and 20% by mass or less, and is further preferably 5% by mass or more and 12% by mass or less.

Here, the reason that the content rate of the conductive particles is in the range described above is that when the content rate of the conductive particles is less than 4% by mass, the amount of the conductive particles excessively decreases with respect to the insulating material, and thus excellent conductivity is not obtained, and a distance between the conductive particles included in the dielectric material excessively increases, and thus it is difficult to obtain properties in which insulation breakdown progresses. In contrast, this is because when the content rate of the conductive particles exceeds 20% by mass, the amount of the conductive particles excessively increases with respect to the insulating material, the size of the conductive particles increases due to aggregation or sintering and the particles of 2 μm or more easily increase, and excellent dielectric properties are obtained but withstand voltage properties necessary for being used as the electrostatic chuck are rarely obtained.

Furthermore, the content rate of the conductive particles in the dielectric material is changed according to the type of insulating material to be used or necessary properties, and it is preferable that the content rate of the conductive particles is optimized in the range described above.

For example, when the insulating ceramics are used as the insulating material, most of the conductive particles unevenly exist in a particle boundary of crystal particles of the insulating ceramics in a sintering step, and a threshold value in which the conductive path is formed decreases compared to a case of being dispersed in an insulating resin.

This is because the uneven existence of the conductive particles is remarkable as the size of the crystal particles of the insulating ceramics becomes larger with respect to the conductive particles, and as the amount of the conductive particles included in the crystal particles of the insulating ceramics becomes smaller.

Therefore, in a case where the particle size distribution of the conductive particles is widened, there is an effect of increasing the threshold value in which the conductive path is formed even when the crystal particles of the insulating ceramics have the same particle diameter. For example, when the particle diameter of the crystal particles of the insulating ceramics is 0.1 μm to 10 μm, the threshold value in which the conductive path is formed is approximately 4% to 20%.

Accordingly, it is preferable that the content rate of the conductive particles is approximately 0.05% by volume to 8% by volume less than the threshold value described above, and it is more preferable that the content rate is approximately 1% by volume to 5% by volume less than the threshold value described above, for example, such that withstand voltage satisfies the specification of the electrostatic chuck.

In addition, in a case where the particle size distribution of the conductive particles is widened, it is possible to include more conductive particles and it is possible to further increase permittivity due to the effect of increasing the threshold value in which the conductive path is formed even when the crystal particles of the insulating ceramics have the same particle diameter.

[Manufacturing Method of Dielectric Material]

A manufacturing method of the dielectric material of this embodiment is a method in which the raw material powder of the insulating material, the raw material powder of the conductive particles, and a dispersion medium are mixed to be a slurry, the slurry is sprayed and dried to be a granule, the granule is burned under increased pressure of 1 MPa or more and 100 MPa or less, and thus the composite sintered compact is obtained.

Next, the manufacturing method will be described in detail.

First, the raw material powder of the insulating material, the raw material powder of the conductive particles, and the dispersion medium are mixed to be the slurry.

As the dispersion medium used in the slurry, water and an organic solvent are able to be used. As the organic solvent, for example, monovalent alcohols such as methanol, ethanol, 2-propanol, butanol, and octanol, and a modified product thereof; alcohols belonging to monocyclic monoterpene such as α-terpineol; carbitols such as butyl carbitol; esters such as ethyl acetate, butyl acetate, ethyl lactate, propylene glycol monomethyl ether acetate, propylene glycol monoethyl ether acetate, butyl carbitol acetate, and γ-butyrolactone; ethers such as diethyl ether, ethylene glycol monomethyl ether (methyl cellosolve), ethylene glycol monoethyl ether (ethyl cellosolve), ethylene glycol monobutyl ether (butyl cellosolve), diethylene glycol monomethyl ether, and diethylene glycol monoethyl ether; ketones such as acetone, methyl ethyl ketone, methyl isobutyl ketone, acetyl acetone, and cyclohexanone; aromatic hydrocarbon such as benzene, toluene, xylene, ethyl benzene; and amides such as dimethyl formamide, N,N-dimethyl acetamide, and N-methyl pyrrolidone are preferably used, and one or two or more thereof are able to be used.

A dispersing agent or a binder may be added at the time of preparing the slurry.

As the dispersing agent or the binder, for example, polycarboxylate such as an ammonium salt of polycarboxylic acid, an organic polymer such as polyethylene glycol, polyvinyl alcohol, and polyvinyl pyrrolidone, and the like are used.

A dispersion treatment is not particularly limited, and as the dispersion treatment, a dispersion treatment using a disperser such as an ultrasonic homogenizer, a bead mill, and an ultrahigh-pressure pulverizer is included.

Furthermore, when the raw material powder of the insulating particles and the raw material powder of the conductive particles are not homogeneously mixed, the distribution of the conductive particles in the dielectric material obtained by compositing the mixture is also unhomogeneous, and reproducibility of electrical properties and homogeneousness in a sintered body may be degraded, and thus it is preferable that the raw material powders are homogeneously mixed by selecting a dispersion medium, a dispersing agent, and dispersion treatment conditions.

Next, the slurry is sprayed and dried by a spray drying method. As a spray drying device, a spray drier or the like is preferably used.

Here, the slurry is sprayed and dried in heated air streaming, only the dispersion medium is scattered in a state where the insulating material and the conductive particles in the slurry are homogeneously dispersed, and thus a granulated powder is obtained in which the conductive particles are homogeneously dispersed in the insulating material.

Next, in a predetermined burning atmosphere, the granulated powder is burned under increased pressure of 1 MPa or more and 100 MPa or less, and thus the composite sintered compact is obtained.

Here, when conductive silicon carbide (SiC) particles, molybdenum (Mo) particles, tungsten (W) particles, tantalum (Ta) particles, and the like are used as the conductive particles, it is necessary to prevent the particles from being oxidized, and thus it is preferable that a non-oxygenated atmosphere, for example, an argon (Ar) atmosphere, a nitrogen ($N_2$) atmosphere, or the like be used as the burning atmosphere.

Here, the reason that the pressure at the time of burning is to set to be 1 MPa or more and 100 MPa or less is that when the pressure is less than 1 MPa, the density of the obtained sintered body decreases, corrosion resistance decreases, and a dense sintered body is not obtained, conductivity also increases, and the usage is limited at the time of being used as a member for a semiconductor manufacturing device, and thus general versatility is degraded. In contrast, this is because when the pressure exceeds 100 MPa, there is no problem in the density and the conductivity of the obtained sintered body, but a pressurized area is limited at the time of designing a sintering device of a large size sintered body according to an increase in the size of the member.

In addition, as a burning temperature, a general sintering temperature which is used in the insulating material to be used is able to be applied. For example, when aluminum oxide is used in the insulating material, it is preferable that the burning temperature is 1500° C. to 1900° C.

The reason that it is preferable to burn the granulated powder at a temperature of 1500° C. or more and 1900° C. or less is that when the burning temperature is lower than 1500° C., the sintering is insufficient, and a dense composite sintered compact may not be obtained, and in contrast, when the burning temperature exceeds 1900° C., the sintering excessively progresses, and abnormal particle growth or the like may occur, and as a result thereof, the dense composite sintered compact may not be obtained.

In addition, a burning time may be a time which is sufficient for obtaining the dense sintered body, and for example, may be 1 hour to 6 hours.

Thus, by simultaneously performing pressurization of 1 MPa or more and 100 MPa or less at the time of burning the granulated powder, it is possible to limit particle growth of each of the insulating material and the conductive particles and to improve the density of the composite sintered compact.

The particle size distribution of the conductive particles in the composite sintered compact is changed according to the sintering of the raw material to be used or the conductive particles in a burning procedure, and thus it is possible to obtain desired properties by adjusting the raw material to be used or the burning conditions.

A method of controlling the particle size distribution of the conductive particles in a slurry manufacturing step may include a method of using the raw material of the conductive particles having a wide particle size distribution, a method of using the mixed raw materials having different particle diameters after, a method of controlling an aggregation state of the conductive particles at the time of mixing the raw material of the insulating material and the raw material of the conductive particles, a method of combining the methods described above, or the like.

A method of controlling the particle size distribution of the conductive particles according to the burning conditions may include a method of controlling formation conditions or a method of controlling a pressure, an atmosphere, a burning temperature, or the like in the burning.

[Properties of Dielectric Material]

Electrical properties of the dielectric material, that is, the composite sintered compact, such as withstand voltage properties, permittivity and the like are changed according to various factors including a dispersion state of the conductive particles dispersed in the insulating material, the size of the particles of the insulating material, the ratio of the conductive particles in the insulating material, the particle diameter distribution of the particles of the insulating material, or the like. Therefore, it is difficult to unambiguously determine a relationship between the particle size distribution of the conductive particles and the electrical properties.

Therefore, a method is used in which the composite sintered compact is prepared in which the particle size distribution is changed by a method of changing the particle size distribution of the conductive particles in the insulating material to various particle size distributions, and an optimized value is experimentally obtained from an evaluation result of the electrical properties.

Among them, since reproducibility of an experiment is excellent, a method is preferably used in which manufacturing conditions of the composite sintered compact are constant, various types of conductive particles having different particle diameters are used in the conductive particles used in the raw material, and the ratio of the conductive particles of the insulating material is changed so that the optimized value is obtained.

In addition, when the optimal type and the particle diameter of the conductive particles and the optimal ratio of the conductive particles in the insulating material are obtained, and the composite sintered compact having the same properties is experimentally produced or is mass-produced, even one type of conductive particles and insulating material is used, it is possible to set the electrical properties of the composite sintered compact to be the optimal value by changing the manufacturing conditions of the conductive particles themselves to obtain the optimal particle size distribution.

[Electrical Properties of Composite Sintered Compact]

(1) Withstand Voltage Properties

Measurement of withstand voltage properties of the composite sintered compact is performed by disposing electrodes on both surfaces of the composite sintered compact, and by measuring a current flowing through the composite sintered compact while gradually increasing the direct-current voltage applied to the electrode.

Here, in consideration of performing the following "Confirmation of Insulation Breakdown Formed Not in the Shape of Pinhole", a silicon wafer having an area of 10 cm$^2$ or more is used in the electrode.

It is necessary that withstand voltage of the composite sintered compact, that is, a voltage at which a current value due to voltage application is increased by insulation breakdown to be 1 nA/cm$^2$ or more is a value higher than the specification of a used voltage or withstand voltage when the composite sintered compact is applied to the base material of the electrostatic chuck, and thus the voltage is preferably 5 kV/mm or more, is more preferably 8 kV/mm or more, and is further preferably 10 kV/mm or more.

However, when the direct-current voltage is applied to the electrode, an electric charge is accumulated in the electrode, and thus the current value is temporarily increased to be 1 nA/cm$^2$ or more according to an increase in the voltage. Here, a constant amount of electric charge is accumulated in the electrode, and then the current value decreases. Here, the current value to be measured is a current value after the electric charge is accumulated. In this procedure, when insulation breakdown progresses in the composite sintered compact, the current value continuously increases due to the influence of the insulation breakdown even after the electric charge is accumulated, and thus the current value gradually increases.

(2) Insulation Breakdown Properties

Measurement of insulation breakdown properties of the composite sintered compact is performed by using a method in which a silicon wafer, for example, having an area of 10 cm$^2$ or more on the electrode of the composite sintered compact, is a measurement terminal after the withstand voltage is measured, and the withstand voltage described above is measured, and then an electrode for measurement which is smaller than the electrode used for measuring the withstand voltage, for example, a silicon chip which is cut to be 5 mm square, is used, and the current value is measured by applying the same voltage again.

In a general insulating body, insulation breakdown instantaneously occurs and a current value instantaneously increases until an acceptable current value of the electric source applying the voltage is exceeded or a material or a surrounding device is broken due to heat generation or discharge.

In contrast, in the composite sintered compact of this embodiment, even when the insulation breakdown progresses in the composite sintered compact, the current value gradually increases, and thus it is possible to detect a sign of the insulation breakdown in the composite sintered compact by using properties in which the current value gradually increases. In addition, the insulation breakdown is an irreversible phenomenon, and thus even when the insulation breakdown progresses at the time of the past use, the measurement is performed by applying the voltage again, and it is confirmed that the current value increases compared to a result measured before the insulation breakdown occurs, and thus it is possible to detect the sign of the insulation breakdown.

In the composite sintered compact of this embodiment, when the withstand voltage properties are measured, it is preferable that a time required for increasing the current value due to the insulation breakdown to 1 nA/cm$^2$ to 100 nA/cm$^2$ be 3 seconds or more, it is more preferable that the time is 10 seconds or more, and it is further preferable that the time be 60 seconds or more.

The reason that the current value which starts the measurement of the time required for increasing the current value due to the insulation breakdown is 1 nA/cm$^2$ is that when the current value is 1 nA/cm$^2$ or less, the determination becomes difficult due to a measurement noise or the like.

In addition, the reason that the current value which ends the measurement of the time required for increasing the current value due to the insulation breakdown is 100 nA/cm$^2$ is because when the current value is 100 nA/cm$^2$ or more, the silicon wafer is adsorbed as the electrostatic chuck, and thus when the voltage is applied to the entire silicon wafer, the total amount of the flowing current value may excessively increase.

When the required time described above is preferably 3 seconds or more, is more preferably 10 seconds or more, and is even more preferably 60 seconds or more, it is possible to stop the device by detecting the sign of the insulation breakdown in the composite sintered compact before the device in the wafer mounted on the composite sintered compact is broken at the current due to the insulation breakdown or before the other device is damaged due to the discharge.

In addition, the insulation breakdown is an irreversible phenomenon, and thus even when the withstand voltage properties are degraded at the time of the past use, the current value is measured by applying a voltage which is the used voltage or more and the withstand voltage value of the composite sintered compact or less before the composite sintered compact is used, and thus it is possible to recognize the sign of the insulation breakdown of the composite sintered compact.

When the composite sintered compact is used as the base material of the electrostatic chuck, the voltage is applied to a wide area, and thus the total amount of the current value increases, and thus it is possible to increase accuracy of the current value detected per a unit area. In addition, the composite sintered compact is combined with an ammeter having high accuracy which is able to detect a small current value, and thus it is possible to detect the sign of the insulation breakdown in an earlier step.

(3) Fractal Properties of Insulation Breakdown

The particle diameter distribution of the conductive particles dispersed in the insulating material of the composite sintered compact is widened, and thus it is possible to improve fractal properties of the association of the conductive particles and fractal properties of the shape of insulation breakdown.

Here, the fractal properties of the insulation breakdown indicate the number of branches of the conductive path which occur in the composite sintered compact due to the insulation breakdown, and when the number of branches of the conductive path increases, the fractal properties increase.

When the portions of the insulation breakdown in the composite sintered compact are formed in the shape of a pinhole, the pinhole is formed in one point or a plurality of points, and thus a difference of 1000 times or more occurs in the current value according to the measurement portion.

As a method of determining the fractal properties of the insulation breakdown by conveniently digitizing the fractal properties, a method is adopted in which a terminal for measurement, for example, a silicon chip cut to be 5 mm square, is mounted on the surface of the composite sintered compact, it is determined as "There are Fractal Properties" when a variation at the time of measuring the distribution of the current value in a plurality of portions of the surface, that is, a ratio (Amax/Amin) of the maximum value (Amax) and the minimum value (Amin) of the current value is less than a predetermined value, and it is determined as "There are No Fractal Properties" when the variation is the predetermined value or more.

Thus, in a case where the current value is simply measured, when the portion of the insulation breakdown is formed in the shape of a pinhole, the pinhole is formed in one point or a plurality of points, and thus a difference of 1000 times or more occurs in the ratio (Amax/Amin).

In contrast, when the portion of the insulation breakdown is not formed in the shape of a pinhole, the difference in the ratio (Amax/Amin) decreases.

Accordingly, when the insulation breakdown occurs in the composite sintered compact, it is preferable that the variation at the time of measuring the distribution of the current value by disposing the silicon chip cut to be 5 mm square on the surface of the composite sintered compact, that is, the ratio (Amax/Amin) of the maximum value (Amax) and the minimum value (Amin) of the current value is 1000 or less, and it is more preferable that the current value simultaneously increases due to the insulation breakdown in all of the measurement points, so that the device does not break due to current constriction.

When the composite sintered compact is used as the base material of the electrostatic chuck, the voltage in the electrostatic chuck is lower than the voltage applied at the time of performing evaluation, but the insulation breakdown in the electrostatic chuck gradually and easily occurs due to damage from plasma or the like or degradation from repeated use. Therefore, when the properties are obtained in which the insulation breakdown due to the evaluation slowly progresses, the properties are obtained in which the insulation breakdown slowly progresses even at the time of being used as the electrostatic chuck.

(4) Permittivity

When the composite sintered compact is used as the base material of the electrostatic chuck, permittivity of the composite sintered compact may increase in order to increase an adsorption force of the electrostatic chuck, is preferably 11 or more, is more preferably 13 or more, and is further preferably 15 or more.

In the composite sintered compact having high permittivity, the withstand voltage may decrease, and thus it is preferable that the permittivity is suitably adjusted according to necessary properties.

As described above, according to the composite sintered compact of this embodiment, the particle diameter D10 having a cumulative volume percentage of 10% by volume in the volume particle size distribution is 0.2 µm or less, the particle diameter D90 having a cumulative volume percentage of 90% by volume is 2 µm or less, the ratio (D90/D10) of the particle diameter D90 having a cumulative volume percentage of 90% by volume to the particle diameter D10 having a cumulative volume percentage of 10% by volume is 3.0 or more, and the ratio (D90/D50) of the particle diameter D90 having a cumulative volume percentage of 90% by volume to the particle diameter D50 having a cumulative volume percentage of 50% by volume is 1.4 or more in the conductive particles dispersed in the insulating material of the composite sintered compact, and thus it is possible to increase the fractal dimension in the shape of insulation breakdown by widening the particle diameter distribution of the conductive particles dispersed in the insulating material of the composite sintered compact, and it is possible to allow the insulation breakdown of the dielectric material made of the composite sintered compact to slowly progress. Therefore, by measuring the electric resistance of the dielectric material made of the composite sintered compact before use or while in use, it is possible to recognize the sign of the insulation breakdown from the electric resistance value. As a result thereof, it is possible to predict the insulation breakdown of the dielectric material made of the composite sintered compact in advance.

In addition, by using a material having high fractal properties in the composite sintered compact, it is possible to disperse the current due to the insulation breakdown, and even when the insulation breakdown occurs, it is possible to prevent the device in the wafer mounted on the composite sintered compact from being damaged.

In addition, by using the composite sintered compact having high fractal properties, the properties are easily obtained in which the insulation breakdown slowly progresses.

In addition, by widening the particle diameter distribution of the conductive particles dispersed in the insulating material of the composite sintered compact, it is possible to increase the permittivity while maintaining the high withstand voltage. Therefore, it is possible to apply the composite sintered compact to the Coulomb force type electrostatic chuck.

EXAMPLES

As described later, the present invention will be described in more detail with reference to Examples and Comparative Examples, but the present invention is not limited to Examples described later.

Example 1

A silicon carbide (SiC) powder having an average particle diameter of 0.05 µm, a silicon carbide (SiC) powder having an average particle diameter of 0.5 µm, and a silicon carbide (SiC) powder having an average particle diameter of 1.0 µm were mixed at a mass ratio of 50:45:5, and thus a SiC mixed powder was obtained.

Next, weighing was performed such that the SiC mixed powder was an 8% by volume, and an aluminum oxide ($Al_2O_3$) powder having an average particle diameter of 0.1 µm was 92% by volume, and the SiC mixed powder and the $Al_2O_3$ powder were put into pure water, and were subjected to a dispersion treatment for 5 hours by an ultrasonic disperser, and then were further subjected to the dispersion treatment for 4 hours by a sun-and-planet ball mill, and thus a dispersion liquid was obtained.

Next, the dispersion liquid was dried at 200° C. by a spray drier, and thus an $Al_2O_3$—SiC composite powder was obtained.

Next, the $Al_2O_3$—SiC composite powder was burned at a temperature of 1650° C. and a pressure of 25 MPa for 2 hours in an argon (Ar) atmosphere by using a hot press, and thus an $Al_2O_3$—SiC composite sintered compact was prepared.

The composite sintered compact was processed into the shape of a disk having a diameter of 100 mm and a thickness of 1.0 mm, and thus an $Al_2O_3$—SiC composite sintered compact of Example 1 was prepared.

Example 2

An $Al_2O_3$—SiC composite sintered compact of Example 2 was prepared by the same method as that in Example 1 except that the SiC mixed powder was 11% by volume, and the $Al_2O_3$ powder was 89% by volume.

Example 3

An $Al_2O_3$—SiC composite sintered compact of Example 3 was prepared by the same method as that in Example 1 except that the SiC mixed powder was 9% by volume, and the $Al_2O_3$ powder was 91% by volume.

Example 4

An $Al_2O_3$—SiC composite sintered compact of Example 4 was prepared by the same method as that in Example 1 except that the SiC powder having an average particle diameter of 0.05 μm was 9% by volume, the $Al_2O_3$ powder having an average particle diameter of 0.1 μm was 91% by volume, the burning temperature was 1800° C., the pressure was 40 MPa, and the dispersion treatment using the sun-and-planet ball mill was not performed after the dispersion treatment using the ultrasonic disperser was performed.

Example 5

A SiC powder having an average particle diameter of 0.03 μm, a SiC powder having an average particle diameter of 0.05 μm, and a SiC powder having an average particle diameter of 0.1 μm were mixed at a mass ratio of 1:1:1, and thus a SiC mixed powder was obtained.

Next, $Al_2O_3$—SiC composite sintered compact of Example 5 was prepared by the same method as that in Example 1 except that the SiC mixed powder was 10% by volume, and the aluminum oxide ($Al_2O_3$) powder having an average particle diameter of 0.1 μm was 90% by volume.

Furthermore, when a specimen was prepared in which the content of the SiC mixed powder was changed from 4% by volume to 13% by volume by an interval of 1% by volume, and a composite sintered compact was prepared by the same method as that in Example 1 using the specimen, the content rate of the SiC mixed powder (10% by volume) was 10% by volume which was a content rate 3% by volume less than the content rate at which the electrical properties were changed from the insulating body to a conductive body.

Example 6

An $Al_2O_3$—SiC composite sintered compact of Example 6 was prepared by the same method as that in Example 1 except that the SiC mixed powder was 5% by volume, and the $Al_2O_3$ powder was 95% by volume.

Example 7

An $Al_2O_3$—SiC composite sintered compact of Example 7 was prepared by the same method as that in Example 1 except that the SiC mixed powder was 12% by volume, and the $Al_2O_3$ powder was 88% by volume.

Example 8

A SiC mixed powder was obtained by the same method as that in Example 1.

Next, weighing was performed such that the SiC mixed powder was 10% by volume, and a yttrium oxide ($Y_2O_3$) powder having an average particle diameter of 0.1 μm was 90% by volume, and the SiC mixed powder and the $Y_2O_3$ powder were put into ion exchange water in a ball mill using a Teflon (registered trademark) ball and a polyethylene pot, and were subjected to the dispersion treatment for 48 hours, and thus a dispersion liquid was obtained.

Next, the dispersion liquid was dried at 200° C. by a spray drier, and thus a $Y_2O_3$—SiC composite powder was obtained.

Next, the $Y_2O_3$—SiC composite powder was burned at a temperature of 1600° C. and a pressure of 40 MPa for 1 hour in an argon (Ar) atmosphere by using a hot press, and thus an $Y_2O_3$—SiC composite sintered compact was prepared.

The composite sintered compact was processed into the shape of a disk having a diameter of 100 mm and a thickness of 1.0 mm, and thus a $Y_2O_3$—SiC composite sintered compact of Example 8 was prepared.

Furthermore, when a specimen in which the content of the SiC mixed powder was changed from 8% by volume to 15% by volume by an interval of 1% by volume was prepared by the same method, and a composite sintered compact was prepared, the content rate of the SiC mixed powder (10% by volume) was 10% by volume which was a content rate 3% by volume less than the content rate at which the electrical properties were changed from the insulating body to a conductive body.

Example 9

A SiC mixed powder was obtained by the same method as that in Example 1.

Next, weighing was performed such that the SiC mixed powder was 9% by volume, a silicon nitride ($Si_3N_4$) powder having an average particle diameter of 0.2 was 85% by volume, and a yttrium oxide ($Y_2O_3$) powder having an average particle diameter of 0.05 μm was 6% by volume as a sintering agent, the SiC mixed powder, the $Si_3N_4$ powder, and the $Y_2O_3$ powder were put into ethanol in a ball mill using a Teflon (registered trademark) ball and a polyethylene pot, and were subjected to the dispersion treatment for 48 hours, and thus a dispersion liquid was obtained.

Next, ethanol was extracted from the dispersion liquid described above by using an evaporator, and then the dispersion liquid was dried in vacuum, and thus a $Si_3N_4$—SiC composite powder was obtained.

Next, the $Si_3N_4$—SiC composite powder was burned at a temperature of 1800° C. and a pressure of 35 MPa for 2 hours in a nitrogen ($N_2$) atmosphere by using a hot press, and thus a $Si_3N_4$—SiC composite sintered compact was prepared.

The composite sintered compact was processed into the shape of a disk having a diameter of 100 mm and a thickness of 1.0 mm, and thus a $Si_3N_4$—SiC composite sintered compact of Example 9 was prepared.

Furthermore, when a specimen in which the content of the SiC mixed powder was changed from 5% by volume to 15% by volume by an interval of 1% by volume was prepared by the same method, and a composite sintered compact was prepared, the content rate of the SiC mixed powder (9% by volume) was 9% by volume which was a content rate 3% by volume less than the content rate at which the electrical properties were changed from the insulating body to a conductive body.

Comparative Example 1

A commercially available $Al_2O_3$ sintered body having purity of 99.9% was processed into the shape of a disk having a diameter of 100 mm and a thickness of 1.0 mm, and thus an Al$_2$O$_3$ sintered body of Comparative Example 1 was prepared.

Comparative Example 2

An Al$_2$O$_3$—SiC composite sintered compact of Comparative Example 2 was prepared by the same method as that in Example 1 except that only a silicon carbide (SiC) powder having an average particle diameter of 0.3 μm was used instead of the SiC mixed powder.

Comparative Example 3

An Al$_2$O$_3$—SiC composite sintered compact of Comparative Example 3 was prepared by the same method as that in Example 1 except that the SiC powder having an average particle diameter of 0.05 μm was 9% by volume and the Al$_2$O$_3$ powder having an average particle diameter of 0.1 μm was 91% by volume.

Comparative Example 4

An Al$_2$O$_3$—SiC composite sintered compact of Comparative Example 4 was prepared by the same method as that in Example 1 except that the SiC mixed powder was 1% by volume and the Al$_2$O$_3$ powder was 99% by volume.

Comparative Example 5

An Al$_2$O$_3$—SiC composite sintered compact of Comparative Example 5 was prepared by the same method as that in Example 1 except that the SiC mixed powder was 13% by volume and the Al$_2$O$_3$ powder was 87% by volume.

Comparative Example 6

The yttrium oxide (Y$_2$O$_3$) powder having an average particle diameter of 0.1 μm was burned at a temperature of 1600° C. and a pressure of 40 MPa for 1 hour in an argon (Ar) atmosphere by using a hot press, and thus an Y$_2$O$_3$ sintered body was prepared.

The sintered body was processed into the shape of a disk having a diameter of 100 mm and a thickness of 1.0 mm, and thus a Y$_2$O$_3$ sintered body of Comparative Example 6 was prepared.

Comparative Example 7

Weighing was performed such that the silicon nitride (Si$_3$N$_4$) powder having an average particle diameter of 0.2 μm was 93% by volume and the yttrium oxide (Y$_2$O$_3$) powder having an average particle diameter of 0.05 μm was 7% by volume as a sintering agent, the Si$_3$N$_4$ powder and the Y$_2$O$_3$ powder were put into ethanol in a ball mill using a Teflon (registered trademark) ball and a polyethylene pot, and were subjected to the dispersion treatment for 48 hours, and thus a dispersion liquid was obtained.

Next, ethanol was extracted from the dispersion liquid described above by using an evaporator, and then the dispersion liquid was dried in vacuum, and thus a Si$_3$N$_4$ powder was obtained.

Next, the Si$_3$N$_4$ powder was burned at a temperature of 1800° C. and a pressure of 35 MPa for 2 hours in a nitrogen (N$_2$) atmosphere by using a hot press, and thus a Si$_3$N$_4$ sintered body was prepared.

The sintered body was processed into the shape of a disk having a diameter of 100 mm and a thickness of 1.0 mm, and thus a Si$_3$N$_4$ sintered body of Comparative Example 7 was prepared.

[Evaluation of Composite Sintered Compact or Sintered Body]

(1) Particle Diameter and Particle Size Distribution

The particle diameter and the particle size distribution of the SiC particles in the composite sintered compact of each of Examples 1 to 9 and Comparative Examples 2 to 5 were measured by a SEM observation method.

Here, the particle diameters D10, D50, and D90, the ratio (D90/D50), and the ratio (D90/D10) of the SiC particles were obtained by the measurement.

The measure results are shown in Table 1.

Furthermore, in the measurement using the SEM observation method, particles of 0.04 μm or less might not be determined, and thus "Presence or Absence of Conductive Fine Particles" in the composite sintered compact of each of Examples 1 to 9 and Comparative Examples 2 to 5, that is, whether or not the conductive fine particles of 0.04 μm or less were included in the composite sintered compact by 0.001% to 5%, was observed by the TEM observation method.

Here, a particle diameter of each of 500 conductive particles was measured, a case where the conductive fine particles of 0.04 μm or less were included at 0.001% to 5% was determined to have conductive fine particles, and thus was indicated as [0], and a case where the conductive fine particles were not included at 0.001% to 5% was determined to have no conductive fine particles, and thus was indicated as [X].

(2) Withstand Voltage and Insulation Breakdown Time

The composite sintered compact or the sintered body of each of Examples 1 to 9 and Comparative Examples 1 to 7 was interposed between the silicon wafers of 35 mm square such that creeping discharge between the electrodes did not occur, the voltage was increased up to a predetermined measurement voltage such that the voltage was increased by 1 kV/mm up to 10 kV/mm, and was increased by 0.5 kV/mm up to 10 kV/mm or more, and thus the current value after maintaining a state where the predetermined measurement voltage was applied for 1 minute was measured.

Here, when the current value after being maintained for 1 minute was 1 nA/cm$^2$ or less, the voltage was further increased by 1 kV/mm or 0.5 kV/mm, and thus the measurement was continued.

In addition, in a case where the current value was 1 nA/cm$^2$ or more, when the value of an ammeter after a lapse of 1 minute was decreased, the voltage was maintained until the voltage was decreased up to 1 nA/cm$^2$, and then the voltage was increased, and thus the measurement was continued.

In addition, when the current value was increased and when the current value exceeded 100 nA/cm$^2$, the applied voltage was the withstand voltage value, and the insulation breakdown time was 1 second or less.

In a case where the current value was increased, when the current value was 100 nA/cm$^2$ or less, a time period from a time at which the voltage started to be maintained to a time at which the voltage reached 100 nA/cm$^2$ was the insulation breakdown time.

In addition, when the voltage did not exceed 100 nA/cm$^2$ even after a lapse of 1 minute or more after being maintained, the maintained voltage was the withstand voltage value, and the insulation breakdown time was 60 seconds or more.

The measure results are shown in Table 2.

(3) Fractal Properties of Insulation Breakdown

A silicon chip of 12 mm square was mounted on the measurement portion of the withstand voltage properties as the electrode, the distribution of the current value of the composite sintered compact or the sintered body was measured by using the electrode, and thus evaluation of the fractal properties of the insulation breakdown was performed.

Here, the measurement of the measurement point of the applied voltage ended when it was confirmed that the withstand voltage value was an upper limit and was 100 nA/cm$^2$ or more. This operation was repeated, and thus the current values of 9 points were measured from the portion where an insulation breakdown test was performed.

When the ratio (Amax/Amin) of the maximum value and the minimum value of the current value measured at 9 points was 1000 or less, it was determined that there were fractal properties and the evaluation result was [O].

In addition, when the ratio (Amax/Amin) of the maximum value and the minimum value of the current value was greater than 1000, a specific distribution of the current value was measured in order to confirm that the insulation breakdown occurred in the shape of a pinhole. Therefore, the measurement was performed while moving the silicon chip of 12 mm square by an interval of 2 mm, an area of a region in which the current value was 100 nA/cm$^2$ or more was obtained, and when the area was in the shape of a point of 4 mm$^2$ or less, the insulation breakdown occurred in the shape of a pinhole, and thus it was determined that there were no fractal properties, and the evaluation result was [X]. Furthermore, even when a portion where the insulation breakdown occurred was able to be visually confirmed due to breakage or the like, it was determined that there were no fractal properties, and thus the evaluation result was [X] in this case, and in other cases, when the insulation breakdown did not occur in the shape of a pinhole but a variation in the current due to the insulation breakdown was increased, and the evaluation result was [Δ].

The measure results are shown in Table 2.

(4) Permittivity

The permittivity in 1 kHz of the composite sintered compact or the sintered body of each of Examples 1 to 9 and Comparative Examples 1 to 7 was measured by using a dielectric measurement system 126096W (manufactured by Toyo Corporation).

The measure results are shown in Table 2.

TABLE 1

| | Particle Diameter | | | | | Presence or Absence |
|---|---|---|---|---|---|---|
| | D10 (μm) | D50 (μm) | D90 (μm) | D90/D50 | D90/D10 | of Conductive Fine Particles |
| Example 1 | 0.13 | 0.75 | 2.0 | 2.67 | 15.4 | O |
| Example 2 | 0.14 | 0.80 | 2.0 | 2.5 | 14.3 | O |
| Example 3 | 0.13 | 0.76 | 1.8 | 2.37 | 13.8 | O |
| Example 4 | 0.10 | 0.48 | 0.71 | 1.48 | 7.10 | O |
| Example 5 | 0.19 | 0.36 | 0.64 | 1.78 | 3.37 | O |
| Example 6 | 0.11 | 0.50 | 1.0 | 2.00 | 9.09 | O |
| Example 7 | 0.16 | 0.86 | 2.4 | 2.79 | 15.0 | O |
| Example 8 | 0.06 | 0.80 | 1.9 | 2.38 | 31.7 | O |
| Example 9 | 0.05 | 0.97 | 1.8 | 1.86 | 36.0 | O |
| Comparative Example 1 | — | — | — | — | — | — |
| Comparative Example 2 | 0.40 | 0.80 | 1.3 | 1.63 | 3.25 | X |
| Comparative Example 3 | 0.05 | 0.07 | 0.09 | 1.29 | 1.80 | O |
| Comparative Example 4 | 0.08 | 0.40 | 0.53 | — | 6.63 | O |
| Comparative Example 5 | 0.17 | 0.93 | 3.0 | — | 17.6 | O |
| Comparative Example 6 | — | — | — | — | — | — |
| Comparative Example 7 | — | — | — | — | — | — |

TABLE 2

| | Withstand voltage (kV/mm) | Insulation Breakdown Time (Second) | Fractal Properties | Permittivity (1 kHz) |
|---|---|---|---|---|
| Example 1 | 14 | >60 | O | 14 |
| Example 2 | 8 | >60 | O | 19 |
| Example 3 | 12 | >60 | O | 15 |
| Example 4 | 7 | 15 | Δ | 11 |
| Example 5 | 15 | >60 | O | 14 |
| Example 6 | 16 | 10 | O | 13 |
| Example 7 | 7 | >60 | O | 20 |
| Example 8 | 11 | >60 | O | 13 |
| Example 9 | 6 | >60 | O | 12 |
| Comparative Example 1 | 14 | <1 | X | 10 |
| Comparative Example 2 | 12 | <1 | X | 12 |
| Comparative Example 3 | 12 | <1 | X | 14 |
| Comparative Example 4 | 15 | <1 | X | 10 |
| Comparative Example 5 | <0.5 | — | — | — |
| Comparative Example 6 | 11 | <1 | X | 11 |
| Comparative Example 7 | 10 | <1 | X | 10 |

The invention claimed is:

1. A dielectric material made of a composite sintered compact in which conductive particles are dispersed in an insulating material,
   wherein in the conductive particles,
   a particle diameter D10 having a cumulative volume percentage of 10% by volume in a volume particle size distribution is 0.2 μm or less,
   a particle diameter D90 having a cumulative volume percentage of 90% by volume is 2 μm or less,
   a ratio (D90/D10) of the particle diameter D90 having a cumulative volume percentage of 90% by volume to the particle diameter D10 having a cumulative volume percentage of 10% by volume is 3.0 or more, and
   a ratio (D90/D50) of the particle diameter D90 having a cumulative volume percentage of 90% by volume to a particle diameter D50 having a cumulative volume percentage of 50% by volume is 1.4 or more.

2. The dielectric material according to claim 1, wherein a content rate of the conductive particles is 4% by mass or more and 20% by mass or less.

3. The dielectric material according to claim 1, wherein the conductive particles are one or two or more selected from a group consisting of conductive silicon carbide particles, molybdenum particles, tungsten particles, tantalum particles, and carbon particles.

4. The dielectric material according to claim 1, wherein the insulating material is one or two or more selected from a group consisting of aluminum oxide, yttrium oxide, silicon oxide, zirconium oxide, aluminum nitride, silicon nitride, and mullite.

5. The dielectric material according to claim 1, wherein relative permittivity is 11 or more.

6. The dielectric material according to claim 1, wherein withstand voltage is 5 kV/mm or more.

7. The dielectric material according to claim 2, wherein the insulating material is one or two or more selected from a group consisting of aluminum oxide, yttrium oxide, silicon oxide, zirconium oxide, aluminum nitride, silicon nitride, and mullite.

8. The dielectric material according to claim 3, wherein the insulating material is one or two or more selected from a group consisting of aluminum oxide, yttrium oxide, silicon oxide, zirconium oxide, aluminum nitride, silicon nitride, and mullite.

9. The dielectric material according to claim 2, wherein relative permittivity is 11 or more.

10. The dielectric material according to claim 3, wherein relative permittivity is 11 or more.

11. The dielectric material according to claim 4, wherein relative permittivity is 11 or more.

12. The dielectric material according to claim 2, wherein withstand voltage is 5 kV/mm or more.

13. The dielectric material according to claim 3, wherein withstand voltage is 5 kV/mm or more.

14. The dielectric material according to claim 4, wherein withstand voltage is 5 kV/mm or more.

15. The dielectric material according to claim 5, wherein withstand voltage is 5 kV/mm or more.

\* \* \* \* \*